United States Patent
Ralston et al.

(10) Patent No.: US 8,356,857 B2
(45) Date of Patent: Jan. 22, 2013

(54) HOOD PEDESTRIAN ENERGY ABSORBER

(75) Inventors: Daniel Ralston, Walker, MI (US); Vidya Revankar, Grand Haven, MI (US)

(73) Assignee: Shape Corp., Grand Haven, MI (US)

( * ) Notice: Subject to any disclaimer, the term of this patent is extended or adjusted under 35 U.S.C. 154(b) by 0 days.

(21) Appl. No.: 13/040,747

(22) Filed: Mar. 4, 2011

(65) Prior Publication Data

US 2011/0214932 A1  Sep. 8, 2011

Related U.S. Application Data

(60) Provisional application No. 61/310,883, filed on Mar. 5, 2010.

(51) Int. Cl.
  *B62D 25/10*  (2006.01)
  *B60R 21/34*  (2011.01)
(52) U.S. Cl. .............................. 296/187.04; 296/193.11
(58) Field of Classification Search ............. 296/187.03, 296/187.04, 187.09, 193.11; 180/271, 274
See application file for complete search history.

(56) References Cited

U.S. PATENT DOCUMENTS

| | | | |
|---|---|---|---|
| 3,933,387 A | 1/1976 | Salloum et al. | |
| 3,938,841 A | 2/1976 | Glance et al. | |
| 4,275,912 A | 6/1981 | Bayer | |
| 4,925,224 A | 5/1990 | Smiszek | |
| 4,941,701 A | 7/1990 | Loren | |
| 5,139,297 A | 8/1992 | Carpenter et al. | |
| 5,290,078 A | 3/1994 | Bayer et al. | |
| 5,290,079 A | 3/1994 | Syamai | |
| 5,425,561 A | 6/1995 | Morgan | |
| 5,988,305 A * | 11/1999 | Sakai et al. | 296/187.04 |
| 5,988,713 A | 11/1999 | Okamura et al. | |
| 6,048,022 A * | 4/2000 | Ishibashi et al. | 296/187.09 |
| 6,068,320 A | 5/2000 | Miyano | |
| 6,082,792 A | 7/2000 | Evans et al. | |
| 6,247,745 B1 | 6/2001 | Carroll, III et al. | |
| 6,315,339 B1 | 11/2001 | Devilliers et al. | |
| 6,398,275 B1 | 6/2002 | Hartel et al. | |
| 6,406,081 B1 | 6/2002 | Mahfet et al. | |
| 6,443,513 B1 | 9/2002 | Glance | |
| 6,467,821 B2 | 10/2002 | Hirota | |
| 6,575,510 B2 | 6/2003 | Weissenborn | |
| 6,609,740 B2 | 8/2003 | Evans | |
| 6,644,701 B2 | 11/2003 | Weissenborn et al. | |
| 6,663,150 B1 | 12/2003 | Evans | |

(Continued)

FOREIGN PATENT DOCUMENTS

| | | |
|---|---|---|
| JP | 2006-027288 | 2/2006 |
| JP | 2008-168844 | 7/2008 |

(Continued)

*Primary Examiner* — Glenn Dayoan
*Assistant Examiner* — Gregory Blankenship
(74) *Attorney, Agent, or Firm* — Price Heneveld LLP

(57) ABSTRACT

An energy absorbing system includes a hood with inner and outer panels defining a rear edge cavity, and a pair of polymeric energy absorbers in the cavity. The hood and energy absorber are tuned to minimize an HIC value when a pedestrian's head contacts the hood during an impact to absorb energy prior to the hood bottoming out on the plenum of the vehicle. The energy absorber is preferably made of a polymeric material capable of withstanding high temperatures associated with going through a paint over or e-coat process, such as high temperature nylon. The illustrated energy absorber has a hat-shaped cross section and includes crisscrossing flanges tuned to provide an optimal force-deflection curve during impact.

19 Claims, 4 Drawing Sheets

U.S. PATENT DOCUMENTS

| | | | |
|---|---|---|---|
| 6,669,251 B2 | 12/2003 | Trappe | |
| 6,669,252 B2 | 12/2003 | Roussel et al. | |
| 6,672,635 B2 | 1/2004 | Weissenborn et al. | |
| 6,685,243 B1 | 2/2004 | Evans | |
| 6,715,592 B2 | 4/2004 | Suzuki et al. | |
| 6,726,262 B2 | 4/2004 | Marijnissen et al. | |
| 6,746,061 B1 | 6/2004 | Evans | |
| 6,758,506 B2 | 7/2004 | Malteste et al. | |
| 6,848,730 B2 | 2/2005 | Evans | |
| 6,848,738 B2 * | 2/2005 | Kempf et al. | 296/187.04 |
| 6,866,313 B2 | 3/2005 | Mooijman et al. | |
| 6,874,832 B2 | 4/2005 | Evans et al. | |
| 6,877,785 B2 | 4/2005 | Evans et al. | |
| 6,883,627 B1 | 4/2005 | Staines et al. | |
| 6,890,009 B2 | 5/2005 | Murata et al. | |
| 6,908,127 B2 | 6/2005 | Evans | |
| 6,920,954 B2 | 7/2005 | Hashimoto et al. | |
| 6,923,494 B2 | 8/2005 | Shuler et al. | |
| 6,938,936 B2 | 9/2005 | Mooijman et al. | |
| 6,949,209 B2 | 9/2005 | Zander et al. | |
| 6,962,379 B2 | 11/2005 | Minami et al. | |
| 6,994,384 B2 | 2/2006 | Shuler et al. | |
| 6,997,490 B2 | 2/2006 | Evans et al. | |
| 7,044,515 B2 | 5/2006 | Mooijman et al. | |
| 7,052,056 B2 | 5/2006 | Weissenborn et al. | |
| 7,073,831 B2 | 7/2006 | Evans | |
| 7,086,690 B2 | 8/2006 | Shuler et al. | |
| 7,090,289 B2 | 8/2006 | Koura | |
| 7,114,765 B2 * | 10/2006 | Ishikawa et al. | 296/193.11 |
| 7,131,674 B2 | 11/2006 | Evans et al. | |
| 7,134,700 B2 | 11/2006 | Evans | |
| 7,144,054 B2 | 12/2006 | Evans | |
| 7,144,055 B2 | 12/2006 | Kimura et al. | |
| 7,150,495 B2 | 12/2006 | Fayt et al. | |
| 7,159,911 B2 | 1/2007 | Nguyen et al. | |
| 7,163,242 B2 | 1/2007 | Shuler et al. | |
| 7,163,243 B2 | 1/2007 | Evans | |
| 7,172,227 B2 | 2/2007 | Weissenborn et al. | |
| 7,188,876 B2 | 3/2007 | Jaarda et al. | |
| 7,204,545 B2 | 4/2007 | Roux et al. | |
| 7,220,374 B2 | 5/2007 | Zander et al. | |
| 7,222,896 B2 | 5/2007 | Evans | |
| 7,222,897 B2 | 5/2007 | Evans et al. | |
| 7,234,741 B1 | 6/2007 | Reynolds et al. | |
| 7,278,667 B2 | 10/2007 | Mohapatra et al. | |
| 7,296,833 B2 | 11/2007 | Mohapatra et al. | |
| 7,325,642 B2 | 2/2008 | Roux et al. | |
| 7,399,014 B2 | 7/2008 | Mellis et al. | |
| 7,413,239 B2 * | 8/2008 | Mitsuyama | 296/187.04 |
| 7,467,680 B2 | 12/2008 | Mason | |
| 7,494,165 B2 | 2/2009 | Evans et al. | |
| 7,578,548 B2 | 8/2009 | Behr et al. | |
| 7,635,157 B2 * | 12/2009 | Wang et al. | 296/193.11 |
| 7,690,720 B2 * | 4/2010 | Wang et al. | 296/193.11 |
| 7,810,877 B2 * | 10/2010 | Ishitobi | 296/193.11 |
| 7,849,559 B2 | 12/2010 | Lindmark et al. | |
| 7,984,943 B2 * | 7/2011 | Iwano et al. | 296/193.11 |
| 7,988,222 B2 * | 8/2011 | Fujimoto | 296/187.04 |
| 8,016,347 B2 * | 9/2011 | Uchino | 296/193.11 |
| 8,052,198 B2 * | 11/2011 | Seksaria et al. | 296/187.04 |
| 2002/0060462 A1 | 5/2002 | Glance | |
| 2002/0070584 A1 | 6/2002 | Carroll, III et al. | |
| 2003/0214151 A1 * | 11/2003 | Vismara et al. | 296/187.04 |
| 2003/0227183 A1 | 12/2003 | Weissenborn et al. | |
| 2004/0036302 A1 | 2/2004 | Shuler et al. | |
| 2004/0066048 A1 | 4/2004 | Mooijman et al. | |
| 2004/0174025 A1 | 9/2004 | Converse et al. | |
| 2004/0201255 A1 | 10/2004 | Jonsson | |
| 2004/0256867 A1 | 12/2004 | Evans et al. | |
| 2004/0262952 A1 * | 12/2004 | Kempf et al. | 296/187.04 |
| 2005/0057076 A1 * | 3/2005 | Roux et al. | 296/187.04 |
| 2005/0088016 A1 | 4/2005 | Ito et al. | |
| 2005/0269837 A1 | 12/2005 | Carroll, III et al. | |
| 2005/0280287 A1 | 12/2005 | Koura | |
| 2006/0001277 A1 | 1/2006 | Mellis et al. | |
| 2006/0006698 A1 | 1/2006 | Ishikawa et al. | |
| 2006/0018089 A1 | 1/2006 | Chou | |
| 2006/0220418 A1 * | 10/2006 | Behr et al. | 296/187.04 |
| 2006/0226679 A1 * | 10/2006 | Mairing | 296/187.04 |
| 2006/0261611 A1 | 11/2006 | Mohapatra et al. | |
| 2007/0069535 A1 | 3/2007 | Mohapatra et al. | |
| 2007/0210615 A1 | 9/2007 | Tamada | |
| 2008/0042454 A1 | 2/2008 | Garnweidner | |
| 2008/0088154 A1 * | 4/2008 | Rocheblave et al. | 296/187.04 |
| 2008/0185871 A1 * | 8/2008 | Ishiyama et al. | 296/187.04 |
| 2009/0025995 A1 * | 1/2009 | Wang et al. | 180/69.2 |
| 2009/0026807 A1 * | 1/2009 | Wang et al. | 296/193.11 |
| 2009/0195020 A1 * | 8/2009 | Wang et al. | 296/187.09 |
| 2009/0206618 A1 | 8/2009 | Ralston et al. | |
| 2009/0295193 A1 | 12/2009 | Park | |
| 2010/0045070 A1 * | 2/2010 | Rocheblave et al. | 296/187.04 |
| 2010/0140979 A1 | 6/2010 | Seksaria et al. | |
| 2011/0214932 A1 * | 9/2011 | Ralston et al. | 180/274 |

FOREIGN PATENT DOCUMENTS

JP    2010-030501    2/2010

* cited by examiner

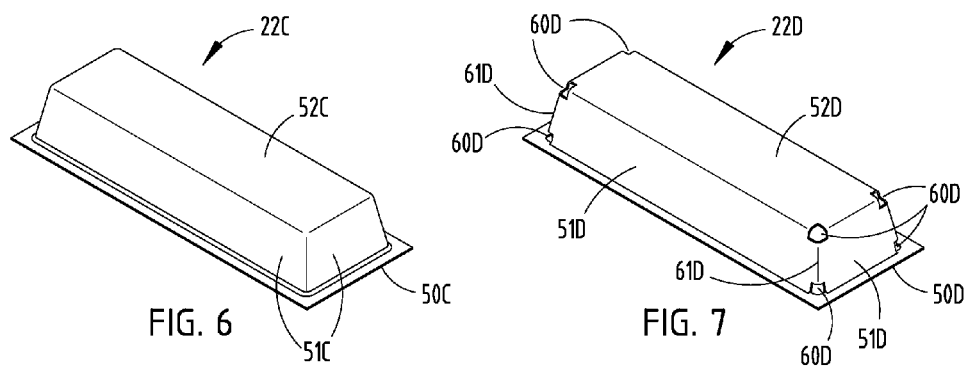
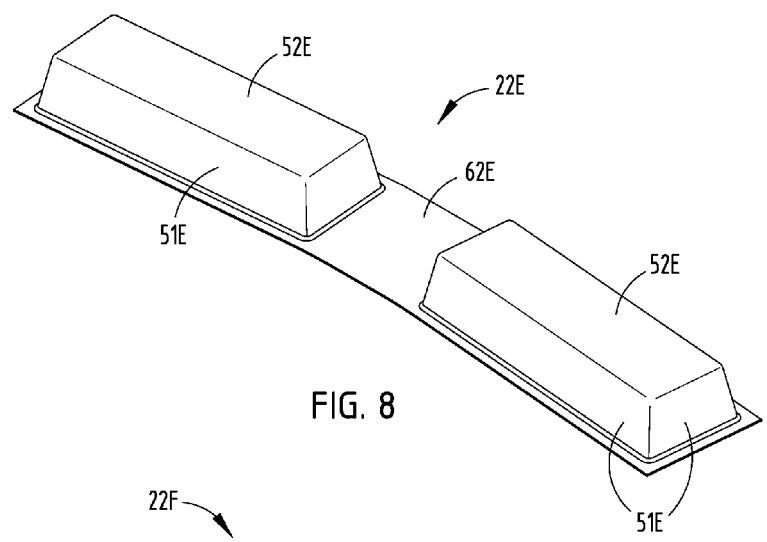
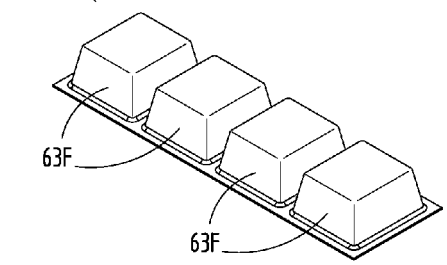

HOOD PEDESTRIAN ENERGY ABSORBER

CROSS-REFERENCE TO RELATED APPLICATION

This application claims benefit under 35 USC §119(e) of provisional application Ser. No. 61/310,883, filed Mar. 5, 2010, entitled HOOD PEDESTRIAN ENERGY ABSORBER, the entire contents of which are incorporated herein by reference.

BACKGROUND

The present invention relates to vehicle hoods, and more particularly relates to a hood assembly incorporating a crushable energy absorber to provide improved pedestrian safety against a vehicle impact.

In an attempt to prevent or minimize pedestrian injury during an impact with an automobile, it is desired that a pedestrian's head incur a reduced head impact criteria (HIC) value during the impact. In fact, there is a Global Technical Regulation (GTR) for pedestrian impacts that is in the process of being adopted. Additionally, the European and Japanese New Care Assessment Program (Euro NCAP) also evaluates vehicles in this regard.

However, any change for improved pedestrian safety during impact must also not adversely affect overall performance of a hood (i.e. "hood assembly"), nor aesthetics of the hood, including a time during normal operation of the vehicle, and also during a vehicle front end impact where the hood must satisfy occupant safety requirements. Thus, there are conflicting requirements on how to meet any such HIC value or GTR requirement.

SUMMARY OF THE PRESENT INVENTION

In one aspect of the present invention, an energy absorbing system is provided for a vehicle having a plenum or other under-hood hard structure. The energy absorbing system including a hood including a hood inner panel and a hood outer panel defining at least one cavity near a rear edge thereof; and further includes at least one energy absorber positioned in the at least one cavity and made of non-foamed polymeric material. The energy absorber has spaced sidewalls configured to crush and absorb energy prior to the outer layer of the hood bottoming out on the plenum or other under-hood hard structure of the vehicle.

In a narrower form, the energy absorber is made of a polymeric material capable of maintaining a shape even when at a temperature of at least 200 degrees centigrade, such that the energy absorber maintains the shape even when sent through a paint oven or e-coat process.

In another aspect of the present invention, an energy absorbing system for a vehicle having a hood, a plenum or other under-hood hard structure. The hood includes a hood inner panel and a hood outer panel defining at least one cavity, and at least one polymeric energy absorber positioned in the at least one cavity that is configured to minimize an HIC value when a pedestrian's head contacts the hood by absorbing energy during an impact into the pedestrian prior to the pedestrian's head bottoming out on the under-hood hard structure of the vehicle.

In another aspect of the present invention, an energy absorbing system is provided for a vehicle having a plenum or other under-hood hard structure. The energy absorbing system includes a hood including a hood outer panel and a hood inner panel defining at least one cavity, and at least one polymeric energy absorber positioned under the hood outer panel and attached to the hood, the energy absorber being configured to absorb energy from an impact from above such as will occur from a pedestrian's head during a pedestrian-vehicle accident, the energy absorber being made of a polymeric material.

In another aspect of the present invention, a method for optimizing head impact criteria (HIC) of a hood on a vehicle is provided comprising steps of: providing a hood including a hood outer panel and hood inner panel defining at least one cavity therebetween, and providing a non-foam energy absorber with walls configured to crush and absorb energy upon impact. The method further includes placing the non-foam energy absorber in the at least one cavity and assembling the hood inner and outer panels with the energy absorber to form a hood assembly; impact testing the hood assembly for HIC value; customizing the energy absorber by forming weakening sites on one or more of the walls of the energy absorber; and repeating the steps of providing a hood, providing an energy absorber, placing and assembling the hood, and impact testing.

In another aspect of the present invention, a method for optimizing head impact criteria (HIC) of a hood on a vehicle is provided comprising steps of: providing a hood including a hood inner panel and a hood outer panel that, when assembled, define at least one cavity and that is configured to aesthetically cover the under-hood hard structures of the vehicle. The method further includes attaching at least one polymeric energy absorber to the hood at a location under the hood where the presence of the energy absorber minimizes an HIC value when a pedestrian's head contacts the hood during an impact, the energy absorber being configured to absorb impact energy prior to the pedestrian's head bottoming out on the under-hood hard structure of the vehicle.

An object of the present invention is to provide an energy absorber, such as an injection molded or thermoformed polymeric energy absorber, attach to one or both of a hood inner and outer so as to absorb energy prior to the hood bottoming out on the plenum or other hard object of the vehicle.

An object of the present invention is to provide an energy absorber that minimizes the HIC value when a pedestrian's head contacts the hood or fender by absorbing energy during the impact prior to the head bottoming out on a hard surface or structure that is thereunder.

An object of the present invention is to provide an energy absorber that if sandwiched between a hood inner and outer, is configured to absorb energy from an impact against a top of a vehicle's hood, where the energy absorber is made of a polymeric material capable of withstanding high temperatures associated with going through a paint over or e-coat process.

These and other aspects, objects, and features of the present invention will be understood and appreciated by those skilled in the art upon studying the following specification, claims, and appended drawings.

BRIEF DESCRIPTION OF DRAWINGS

FIGS. 3-9 are perspective views of different hood energy absorbers for optimizing HIC for pedestrian-vehicle impacts.

DETAILED DESCRIPTION OF PREFERRED EMBODIMENTS

Figure 1:
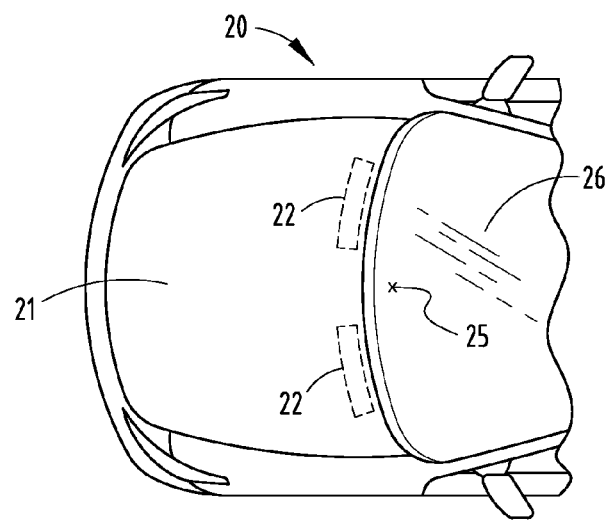
FIG. 1 is a top view of a vehicle front end, including a portion of a rear of the engine hood and a portion of the vehicle front windshield.

The present apparatus 20 (FIGS. 1-3) includes a vehicle hood 21 with energy absorber 22 positioned in a cavity 30 between the hood's inner and outer panels 23 and 24 near the plenum 25 of the vehicle (i.e., immediately in front of the vehicle's front windshield 26). The panels 23 and 24 are commonly held together using mastic adhesive 23' and/or by mechanical means (such as by hemmed flanges along a perimeter of the hood), with the inner panel 23 stiffening the outer panel 24 for aesthetics and function. During a pedestrian impact, a pedestrian's head 27 may engage the hood 21 near a rear of the hood as the pedestrian falls/tumbles onto the hood. The force and stroke of the impact are related to the extent of injury caused. By limiting maximum force spikes and providing optimal resistance levels over the stroke distance and time period of impact, the amount of injury can be reduced.

Figure 2:
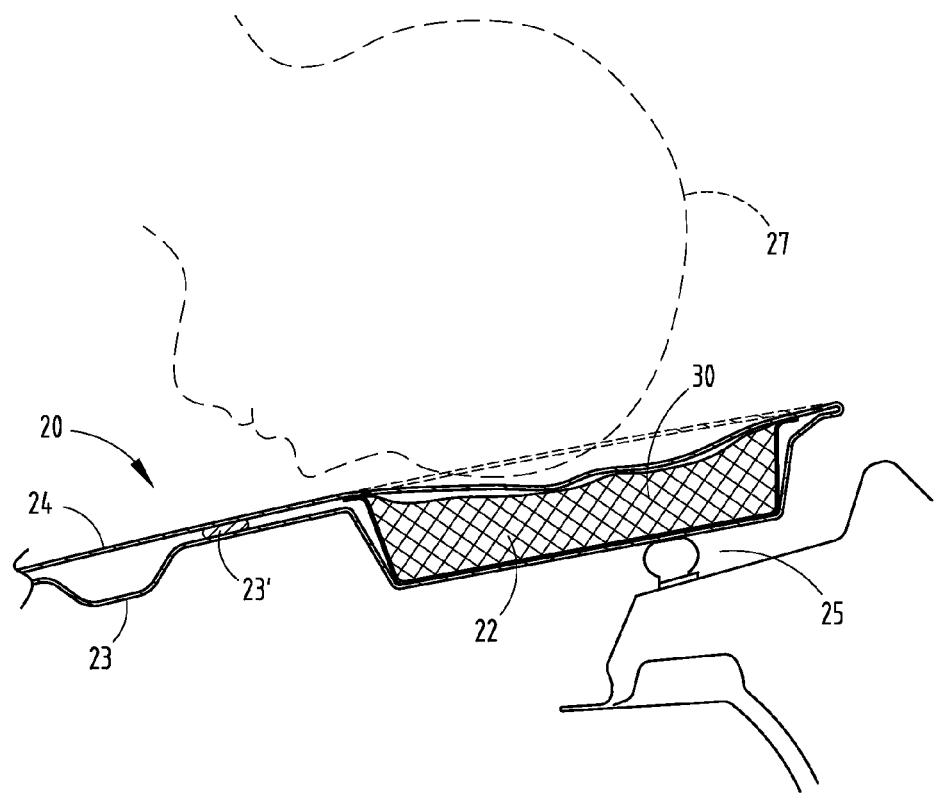
FIG. 2 is a side view of FIG. 1 taken along a longitudinal line of the vehicle, including a pedestrian's head shown in dashed lines.
Figure 3:
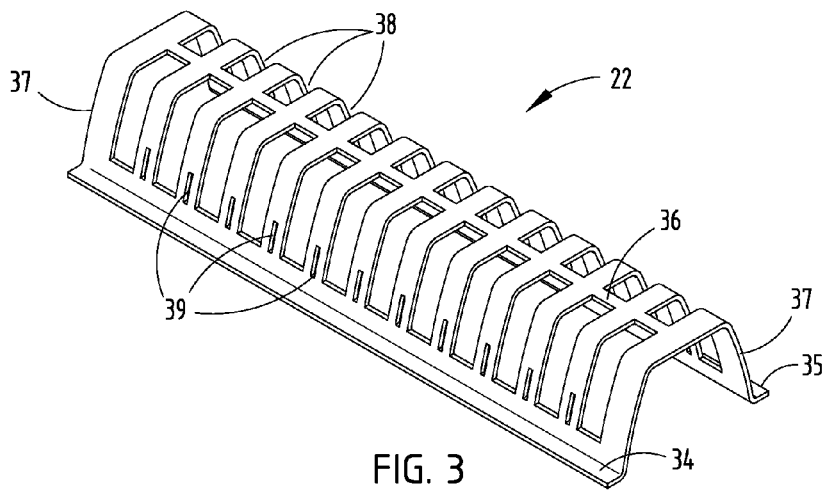

As shown in FIG. 2, the illustrated inner and outer panels 23 and 24 define right and left cavities 30 near a rear of the hood 21. The energy absorber 22 is configured to fit into the cavity 30 and to engage the hood inner and outer panels 23-24 as it is crushed during a top-down impact from a pedestrian's head during a vehicle-pedestrian impact. Notably, a cross-sectional shape of the illustrated energy absorber 22 generally matches a cross-sectional shape of the cavity 30, such that top, bottom, and sides of the energy absorber 22 engage adjacent surfaces and structure forming the cavity 30. Potentially, an outer perimeter flange of the energy absorber 22 is positioned partially within a wedge-shaped edge of the cavity 30, such as is shown near the hood outer 24 in FIG. 2. Sidewalls of the energy absorber 22 extend at an angle between the hood inner and outer 23, 24, such as at an angle of 45 degrees to 90 degrees to the hood outer 24. The energy absorber 22, and in particular the sidewalls are positioned such that they crumple and bend at one or more locations in a manner maximizing energy absorption during the impact while minimizing load spikes and peaks, and while also minimizing HIC values. The energy absorber 22 can be made from different materials. A preferred material is nylon (or other heat resistant polymer), which is an injection molded non-foam polymer such that the side walls have a solid mass.

It is contemplated that the energy absorbers can be customized to have different structures and can be made of different materials to provide different functions, characteristics, and aesthetic appearances in the assembled hood. For example, the energy absorber 22 (FIG. 3) includes longitudinal edge flanges 34 and 35, a longitudinal middle flange 36, and transverse U-shaped "bridge" flanges 37 and 38. It is noted that the end-located flanges 37 can be made slightly larger than the other bridge flanges 38, and further that particular flanges 34-38 can be tuned to a provide a particular energy-absorbing profile and function. For example, the flanges 38 located away from the ends have an aperture 39 near their ends. In cross section, the energy absorber defines a hat shaped profile, with relatively flat top section matching the hood outer panel, relatively curved side sections matching a changing shape of the cavity between the inner and outer panels, and a relatively outwardly-extending flat edge flanges matching a narrow feature where the inner and outer panels join.

Figure 4:
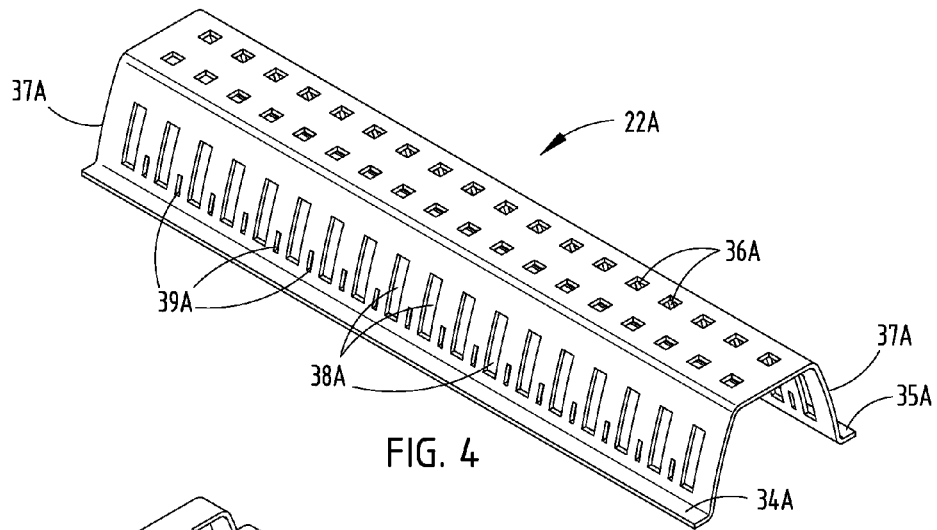

Energy absorber 22A (FIG. 4) includes edge flanges 34A-35A and three middle flanges 36A and almost double the number of bridge flanges 37A-38A. Also, the end flanges 37A are considerably smaller in width than the earlier end flange 37, and the end flanges 37A are similar in width to the middle flanges 38A. Also, flanges 38A include apertures 39A.

Figure 5:
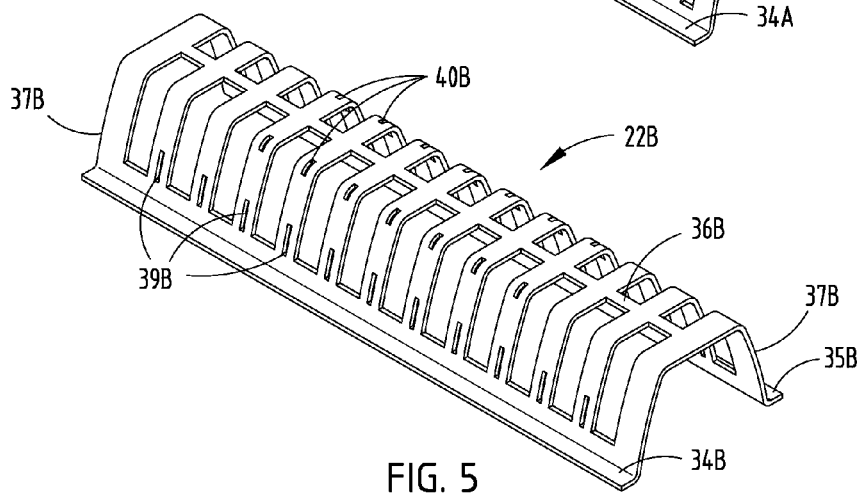

Energy absorber 22B (FIG. 5) is similar to energy absorber 22 in terms of the cross-sectional size and spacing and size of flanges 34B-38B. However, some flanges 38B have additional apertures 40B near an upper bend leading onto their top surface. These apertures 40B reduce an impact strength of the energy absorber 22B near a center area of the energy absorber 22B.

Energy absorbers 22C-22H (FIGS. 6-11) are similar to energy absorbers 22-22B in terms of their outer shape and profile, but the energy absorbers 22C-22H include side walls with less openings such that they have more mass and have the ability to absorb more energy (depending on a thickness and shape of the walls, as noted below). Specifically, energy absorber 22C (FIG. 6) includes a base (top) flange 50C, side walls 51C, and bottom wall 52C, with the walls 51C and 52C forming a crush box where the walls 51C crumple and collapse during an impact with multiple bends and folds for optimal energy absorption during the impact, while minimizing load spikes and peaks. Energy absorber 22D (FIG. 7) is similar to the energy absorber 22C (FIG. 6), and similar components are similarly identified except using a letter D. However, energy absorber 22D includes apertures 60D at top and bottom of corners 61D (i.e. at locations of juncture of the side walls 51D). The reason for apertures 60D is because with zero apertures, the corners 61D have increased beam strength over the side wall 51D itself, thus potentially leading to load spikes during an impact (depending on where a pedestrian's head strikes the hood). By providing apertures 60D, the beam strength is reduced, such that the entire crush box provides a more uniform expected impact strength regardless of the impact location. The energy absorber 22E (FIG. 8) is similar to energy absorber 22C (FIG. 6), except that the right and left components form right and left parts that are connected by a strap 62E, such that energy absorber 22E is molded as a single component that can be handled and assembled into the hood as a single unit. The energy absorber 22F (FIG. 9) is similar to energy absorber 22C, except that energy absorber 22F has four adjacent (smaller) crush boxes 63F formed in a same space as the single crush box of energy absorber 22C.

Figure 10:
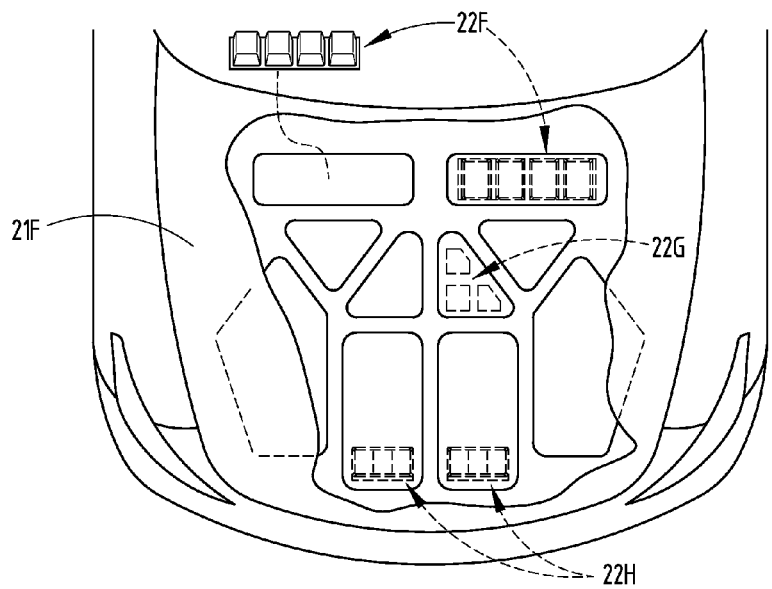
FIGS. 10-11 are top and perspective views of a hood and showing multiple locations of energy absorbers and also additional energy absorbers for use in the hood.
Figure 11:
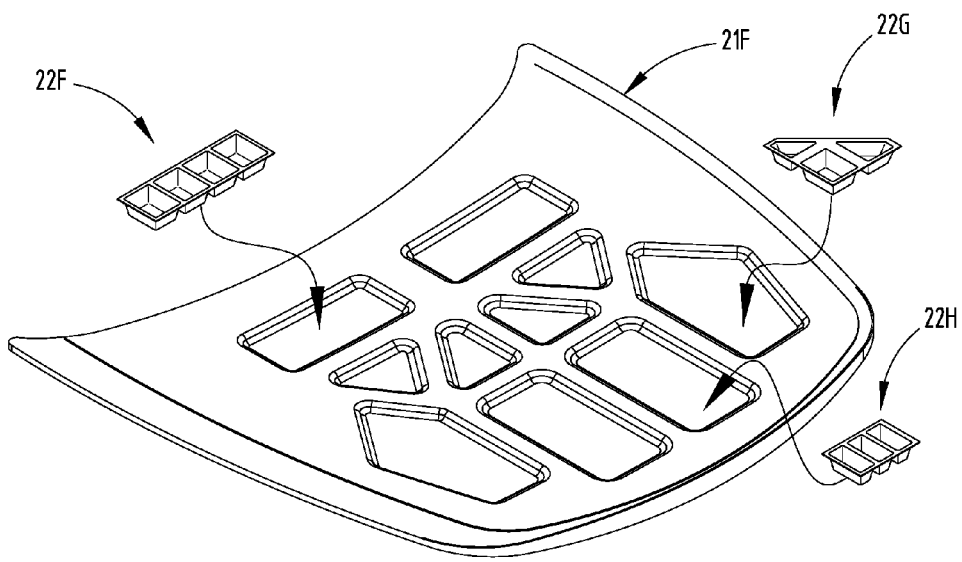

FIGS. 10-11 show a hood 21F having multiple energy absorbers 22F, 22G, and 22H generally located under the hood outer panel in an opening in the hood inner panel. For example, the energy absorber 22F is located along a rear edge of the hood 21F (near a vehicle's plenum area, but in an opening near a rear of the hood inner panel), and with the energy absorber 22G located partially in a downwardly-open triangular cavity defined by the hood inner panel under the hood outer panel (such as over the engine or other hard under-hood structures), and with the energy absorber 22H positioned at a front of the hood 21F in an opening in the hood inner panel (such as near a hood latch or over the vehicle's bulkhead structure supporting a radiator). Flanges on a perimeter of the energy absorbers 22F, 22G and 22H keep the energy absorbers attached to the hood assembly. Of course, it is contemplated that any of the energy absorbers could also be entirely within a cavity between the hood inner and outer panels.

The illustrated energy absorbers 22 are each about 35-40 mm tall, about 92 mm wide and about 365 mm long. The energy absorbers 22A-22J are similarly sized as necessary to fit within the cavity they are intended for. As illustrated, the hood 21 creates right and left cavities, but it is contemplated that a single cross-car cavity can exist and that a single energy absorber could extend completely cross car. Alternatively, it is contemplated that the illustrated two energy absorbers can be interconnected by a strap or tether or other connector so that they can be handled as a unit. The illustrated energy absorbers have a cross-sectional shape formed by slightly angled walls that are open and generally not orthogonal. It is contemplated that a cross sectional shape of the energy absorbers will generally match a cross-sectional shape of the cavity in which it is placed, but that this is not required necessarily unless the functional aspects require that. The hood and energy absorber as a designed assembly are tuned to provide a force-deflection profile minimizing an HIC value. The energy absorber is preferably made of a polymeric material. When the energy absorber will be attached to the hood assembly prior to coating, the energy absorber will be made of a polymer capable of withstanding high temperatures associated with going through a paint over or e-coat process, such as high temperature nylon. However, it is contemplated that the material could also be metal or other structural material that absorbs energy during collapse. Also, one advantage of connecting the energy absorber to the hood but not sandwiching it between the hood layers is that it won't need to go through an oven.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. An energy absorbing system for a vehicle having a plenum or other under-hood hard structure, comprising:
   a hood including a hood inner panel and a hood outer panel with interconnected portions defining at least one cavity and wedge-shaped edges near a rear edge thereof; and
   at least one energy absorber positioned in the at least one cavity and including a perimeter flange positioned in and retained within the wedge-shaped edges and made of non-foamed polymeric material, the energy absorber having spaced sidewalls configured to crush and absorb energy prior to the hood outer panel of the hood bottoming out on the plenum or other under-hood hard structure of the vehicle.

2. The system defined in claim 1, wherein the energy absorber includes an open cross section having a shape of the cross section of the at least one cavity.

3. The system defined in claim 1, wherein the energy absorber includes a transverse wall defining with the spaced sidewalls a hat-shaped cross section.

4. The system defined in claim 1, wherein the energy absorber includes longitudinal edge flanges that fit partially between the hood inner panel and the hood outer panel.

5. The system defined in claim 1, wherein the energy absorber includes a plurality of longitudinal and transverse flanges forming a matrix.

6. The system defined in claim 1, wherein the energy absorber has a cross-sectional shape that is not orthogonal but that generally matches a cross-sectional shape of the cavity in which the energy absorber is positioned.

7. The system defined in claim 1, wherein the hood and the energy absorber combine to provide a force-deflection profile minimizing an HIC value.

8. The system defined in claim 1, wherein the energy absorber includes a polymeric material capable of maintaining a shape even when at a temperature of at least 200 degrees centigrade, such that the energy absorber can maintain the shape when going through a paint oven or e-coat process.

9. The system defined in claim 8, wherein the polymeric material is a nylon polymer.

10. An energy absorbing system for a vehicle having a hood, a plenum or other under-hood hard structure, comprising:
    the hood including a hood inner panel and a hood outer panel with interconnected portions defining at least one cavity with wedge-shaped edges; and
    at least one polymeric energy absorber positioned in the at least one cavity and including a perimeter flange positioned in and retained within the wedge-shaped edges and that is configured to minimize an HIC value when a pedestrian's head contacts the hood by absorbing energy during an impact into the pedestrian prior to the pedestrian's head bottoming out on the under-hood hard structure of the vehicle.

11. The system defined in claim 10, wherein the polymeric material is capable of maintaining a shape even at a temperature of at least 200 degrees centigrade, such that the energy absorber maintains the shape even when going through a paint oven or e-coat process.

12. An energy absorbing system for a vehicle having a plenum or other under-hood hard structure, comprising:
    a hood including a hood outer panel and a hood inner panel with interconnected portions defining at least one cavity with wedge-shaped edges; and
    at least one polymeric energy absorber including a perimeter flange positioned in and retained within the wedge-shaped edges and positioned under the hood outer panel but attached to the hood, the energy absorber being configured to absorb energy from an impact from above from a pedestrian's head during a pedestrian-vehicle accident, the energy absorber being made of a polymeric material.

13. The system defined in claim 12, wherein the energy absorber includes at least one hollow crush lobe that protrudes generally upwardly when in a vehicle-mounted position.

14. A method for optimizing head impact criteria (HIC) of a hood on a vehicle comprising steps of:
    providing a hood including a hood outer panel and hood inner panel with interconnected portions defining at least one cavity with wedge-shaped edges;
    providing a non-foam energy absorber with walls configured to crush and absorb energy upon impact and with a perimeter flange;
    placing the non-foam energy absorber in the at least one cavity and assembling the hood inner and outer panels with the perimeter flange of the energy absorber positioned in and retained within the wedge-shaped edges to form a hood assembly;
    impact testing the hood assembly for HIC value;
    customizing the energy absorber by forming weakening sites on one or more of the walls of the energy absorber; and
    repeating the steps of providing a hood, providing an energy absorber, placing and assembling the hood, and impact testing.

15. The method defined in claim 14, wherein the step of customizing by forming weakening sites includes forming at least one of apertures and slits in the walls.

16. A method for optimizing head impact criteria (HIC) of a hood on a vehicle, the vehicle including under-hood hard structures, comprising steps of:

providing a hood including a hood inner panel and a hood outer panel that, when assembled, define at least one cavity with wedge-shaped edges and that is configured to aesthetically cover the under-hood hard structures of the vehicle; and attaching at least one polymeric energy absorber to the hood at a location under the hood where the presence of the energy absorber minimizes an HIC value when a pedestrian's head contacts the hood during an impact, the energy absorber including at least one perimeter flange positioned in and retained at least in part by the wedge-shaped edges and being configured to absorb impact energy prior to the pedestrian's head bottoming out on the under-hood hard structure of the vehicle.

17. The method defined in claim 16, wherein the step of attaching is done during or prior to assembly of the hood inner panel to the hood outer panel.

18. The method defined in claim 17, wherein the step of attaching includes placing the energy absorber in a cavity defined between the hood inner panel and the hood outer panel.

19. The method defined in claim 17, wherein the step of attaching includes placing the energy absorber in a location where the energy absorber is not covered by the hood inner panel.

* * * * *